(12) United States Patent
Bernal et al.

(10) Patent No.: US 8,077,356 B2
(45) Date of Patent: Dec. 13, 2011

(54) CONTENT-AWARE HALFTONE IMAGE RESIZING USING ITERATIVE DETERMINATION OF ENERGY METRICS

(75) Inventors: Edgar Bernal, Webster, NY (US); Robert P Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 683 days.

(21) Appl. No.: 12/242,119

(22) Filed: Sep. 30, 2008

(65) Prior Publication Data

US 2010/0079771 A1 Apr. 1, 2010

(51) Int. Cl.
*G06K 15/00* (2006.01)
*G06K 9/32* (2006.01)
*H04N 1/405* (2006.01)

(52) U.S. Cl. .................. 358/3.06; 358/2.1; 382/298

(58) Field of Classification Search .............. None
See application file for complete search history.

(56) References Cited

U.S. PATENT DOCUMENTS

| | | |
|---|---|---|
| 4,149,194 A | 4/1979 | Holladay |
| 4,185,304 A | 1/1980 | Holladay |
| 4,811,115 A | 3/1989 | Lin et al. |
| 5,799,112 A | 8/1998 | de Queiroz et al. |
| 6,734,991 B1 | 5/2004 | Schweid |
| 6,839,152 B2 | 1/2005 | Fan et al. |
| 6,864,994 B1 | 3/2005 | Harrington |
| 7,239,430 B2 | 7/2007 | Shiau et al. |
| 7,747,107 B2 * | 6/2010 | Avidan et al. ............ 382/298 |

OTHER PUBLICATIONS

Bernal et al., U.S. Appl. No. 12/242,036, filed simultaneously herewith, entitled "Content-Aware Halftone Image Resizing".
Bernal et al., U.S. Appl. No. 12/242,183, filed simultaneously herewith, entitled "Content-Aware Resizing of Uniform Rosette Color Halftone Images".
Bernal et al., U.S. Appl. No. 12/242,222, filed simultaneously herewith, entitled "Content-Aware Uniform Rosette Color Halftone Image Resizing Using Iterative Determination of Energy Metrics".
Avidan and Shamir, entitled "Seam Carving for Content-Aware Image Resizing", Mitsubishi Electric Research Labs, ACM Transactions on Graphics, vol. 26, No. 3, SIGGRAPH 2007.

* cited by examiner

*Primary Examiner* — Twyler Haskins
*Assistant Examiner* — Barbara Reinier
(74) *Attorney, Agent, or Firm* — Philip E. Blair; Fleit Gibbons Gutman Bongini & Bianco P.L.

(57) ABSTRACT

As provided herein, there are supplied teachings to systems and methods for resizing a halftone image using halftone tile parameters. One approach entails receiving into a digital imaging system, a digital halftone image and a desired resizing factor for that digital halftone image. The system will then define cells within the digital halftone image and determine from those cells, a number of halftone tile seams to suitable for manipulation. The orientation of these halftone tile seams is dictated by the received desired resizing factor. The seam energy of these halftone tile seams is then determined according to an energy metric so as to provide indication of a number of low energy determined halftone tile seams. The number of low energy seams identified is sufficient to achieve the desired resizing factor. A resizing of the halftone image is then performing by iteratively deleting the low energy determined halftone tile seams within the halftone image. The resized halftone image may then be printed on a printer.

38 Claims, 5 Drawing Sheets

CONTENT-AWARE HALFTONE IMAGE RESIZING USING ITERATIVE DETERMINATION OF ENERGY METRICS

CROSS-REFERENCE TO COPENDING APPLICATIONS

Attention is directed to copending applications filed concurrently herewith: entitled "Content-Aware Halftone Image Resizing"; U.S. application Ser. No. 12/242,036, entitled "Content-Aware Resizing of Uniform Rosette Color Halftone Images"; U.S. application Ser. No. 12/242,183, entitled "Content-Aware Uniform Rosette Color Halftone Image Resizing Using Iterative Determination of Energy Metrics"; U.S. application Ser. No. 12/242,222, the disclosures found in these copending applications is hereby incorporated by reference in their entirety. The appropriate components and processes of the above co-pending applications may be selected for the teaching and support of the present application in embodiments thereof.

BACKGROUND AND SUMMARY

The teachings herein are directed to a method and apparatus for resizing a halftone image using halftone tile parameters.

Demands imposed by today's digital media handling in regards to document edit-ability, portability, and dynamic layout make simple solutions for image resizing obsolete. Consider that a document can be rasterized and halftoned for a particular print path. That document may be directed to a different printer, possibly years later when extracted from an archive, with different paper size capabilities and may require image editing, cropping and resizing of halftoned image content prior to printing on the given print engine. Halftoned images may generally be re-purposed to print on different paper sizes and require layout modifications and resizing. Printed halftone images may be scanned in a setting such as at a digital copier, and a user may wish to modify the image attributes such as size, aspect ratio, or image content. Conventional resizing methods that utilize spatially consistent interpolation methods are unsuitable in this halftone image setting because interpolation methods introduce defects in halftone image structure and such spatially consistent interpolation can distort image content.

To begin, consider the halftone image class of concern to the present teachings herein. With the advent of inexpensive digital color printers, methods and systems of color digital halftoning have become increasingly important in the reproduction of printed or displayed images possessing continuous color tones. It is well understood that most digital color printers operate in a binary mode, i.e., for each color separation, a corresponding color spot is either printed or not printed at a specified location or pixel. Digital halftoning controls the printing of color spots, where the spatial averaging of the printed color spots by either a human visual system or a viewing instrument, provides the illusion of the required continuous color tones.

The most common halftone technique is screening, which compares the required continuous color tone level of each pixel for each color separation with one or more predetermined threshold levels. The predetermined threshold levels are typically defined for a rectangular cell that is tiled to fill the plane of an image, thereby forming a halftone screen of threshold values. At a given pixel, if the required color tone level is darker than the given halftone threshold level, a color spot is printed at that specified pixel. Otherwise the color spot is not printed. The output of the screening process is a binary pattern of multiple small "dots," which are regularly spaced as is determined by the size, shape, and tiling of the halftone cell. In other words, the screening output, as a two-dimensionally repeated pattern, possesses two fundamental spatial frequencies, which are completely defined by the geometry of the halftone screen.

It is understood in the art that the distribution of printed pixels depends on the design of the halftone screen. For clustered-dot halftone screens, all printed pixels formed using a single halftone cell typically group into one or more clusters. If a halftone cell only generates a single cluster, it is referred to as a single-dot halftone or single-dot halftone screen. Alternatively, halftone screens may be dual-dot, tri-dot, quad-dot, or the like.

While halftoning is often described in terms of halftone dots, it should be appreciated that idealized halftone dots can possess a variety of shapes that include rectangles, squares, lines, circles, ellipses, "plus signs," X-shapes, pinwheels, and pincushions, and actual printed dots can possess distortions and fragmentation of those idealized shapes introduced by digitization and the physical printing process. Various digital halftone screens having different shapes and angles are described in U.S. Pat. No. 4,149,194, "Variable Angle Electronic Halftone Screening" to inventor Thomas M. Holladay, which is hereby incorporated by reference in its entirety.

A current practice for resizing an image is to perform some type of resampling interpolation of the input image to generate an output image with the desired number of samples in each dimension. But, resampling a halftone image with an interpolator such as nearest-neighbor, linear, quadratic, or cubic can result in defects within the halftone image. One particularly problematic defect is the introduction of gray levels that must be re-halftoned prior to printing, where the re-halftoning step creates an interference pattern with the input halftone image structure. Another defect is the appearance of seams along columns or rows of pixels, where the resampled halftone samples have a local disturbance in phase with respect to the halftone frequency. Yet another defect associated with these resampling methods is that the aspect ratio of important image content can become distorted. For example, use of resampling to reduce the vertical dimension of an image can make people appear shorter and wider than they are in reality.

Another practice for resizing a halftone image is simply to crop that image to the desired size. However, cropping can delete desired image content around the borders of the halftone image.

The diversity and versatility of display devices today imposes new demands on digital media. For instance, designers must create different alternatives for web-content and design different layouts for different display and rendering devices. These demands have lead to development of increasingly sophisticated image resizing tools for continuous tone digital images. Avidan and Shamir, in "Seam Carving for Content-Aware Image Resizing" ACM Transactions on Graphics, Volume 26, Number 3, SIGGRAPH 2007, present a simple image operator called seam carving, that supports content-aware image resizing for both image reduction and image expansion. A seam is an optimal eight-connected path of pixels on a single image from top to bottom, or left to right, where optimality is defined by a low value of an image energy function. By repeatedly carving out or inserting seams in one direction, Avidan and Shamir can change the aspect ratio of an image. By applying these operators in both directions they can retarget the image to a new size. The selection and order of seams protect the content of the image, as defined by the energy function. Seam carving can also be used for image content enhancement and object removal. The seam carving method of Avidan and Shamir can support various visual saliency measures for defining the energy of an image, and can also include user input to guide the process. By storing the order of seams in an image they create multi-size images that are able to continuously change in real time to fit a given size.

The method of Avidan and Shamir cannot be readily applied to halftone images because selecting low energy seams will result in visually undesirable pathological seams that travel between halftone dots or along chains of connected dots. Removing a low-energy seam that travels between halftone dots would only increase the local darkness in the region about the seam. Conversely, removing a low-energy seam that traveled along connected halftone dots will decrease local darkness in the region about the seam. In either case, the seams would appear as visible streaks and would quite likely be objectionable. For example an input halftone image where the pixels are at 600 dpi (dots per inch) resolution, and the halftone is at 141 cpi (cells per inch) at 450 when resized by 10% in the horizontal direction by applying a low energy seam removal method directly on the halftone image caused undesirable streaks to appear in the image.

One further option for resizing a halftone image is to apply a descreening technique to the halftone image to remove the halftone dot structure and provide a continuous tone version of the image. The continuous tone version of the image could be resized using the method of Avidan and Shamir. After resizing, the image may be rehalftoned to finally produce a resized binary image. However, a key problem with that approach is that any such descreening technique tends to blur fine details within an image and the resulting image will have an excessively "soft" appearance. This softness problem will be particularly evident when applied in binary printer image paths and copier image paths that utilize a "copy dot" approach to reproduction. "Copy dot" refers to direct copying of a halftone image without descreening and rescreening. Resizing such a descreened image will induce a blurring that "copy dot" reproduction is intended to avoid.

As provided herein, there are supplied teachings to systems and methods for resizing a halftone image using halftone tile parameters. One approach entails receiving into a digital imaging system, a digital halftone image and a desired resizing factor for the digital halftone image. Subsequently the system will define cells within the digital halftone image and determine from those cells, a number of halftone tile seams to suitable for manipulation. The orientation of these halftone tile seams is dictated by the received desired resizing factor. The seam energy of the number of halftone tile seams is determined according to an energy metric so as to provide indication of at least one low energy determined halftone tile seam. A resizing of the halftone image is then performing by iteratively deleting at least one low energy halftone tile seam in the halftone image. The resized halftone image may then be printed on a printer.

Also disclosed in embodiments herein is an image forming method for resizing a digital halftone image. The approach entails receiving into a digital imaging system, a digital halftone image and a desired resizing factor for that digital halftone image. The system will then define cells within the digital halftone image and determine from those cells, a number of halftone tile seams to suitable for manipulation. The orientation of these halftone tile seams is dictated by the received desired resizing factor. The seam energy of these halftone tile seams is then determined according to an energy metric so as to provide indication of a number of low energy determined halftone tile seams. The number of low energy seams identified is sufficient to achieve the desired resizing factor. A resizing of the halftone image is then performing by iteratively deleting the low energy determined halftone tile seams within the halftone image. The resized halftone image may then be printed on a printer.

Further disclosed in embodiments herein is an image forming method for resizing a digital halftone image. The method entails receiving into a digital imaging system, a digital halftone image and a desired resizing factor for that digital halftone image. The system will then define cells within the digital halftone image and determine from those cells, a number of halftone tile seams to suitable for manipulation. The orientation of these halftone tile seams is dictated by the received desired resizing factor. The digital halftone image is descreened to provide an energy map. The seam energy of these halftone tile seams is then determined according to the energy map so as to provide indication of a number of low energy determined halftone tile seams. The number of low energy seams identified is at least sufficient to achieve the desired resizing factor for the digital halftone image. A resizing of the halftone image is then performing by iteratively deleting the number of low energy determined halftone tile seams within the halftone image to obtain a resized image. The resized halftone image may then be printed on a printer.

DETAILED DESCRIPTION

Figure 1:
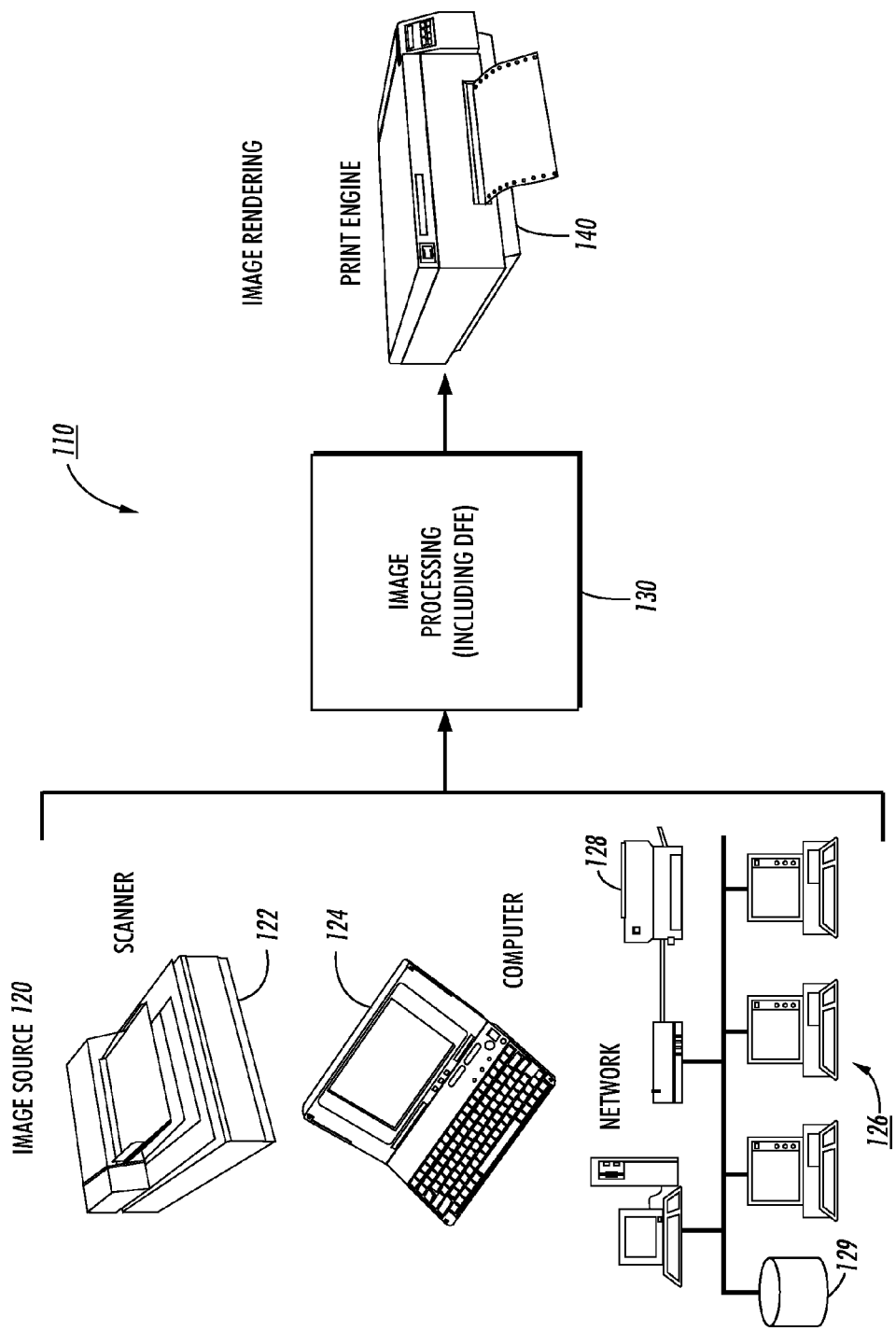
FIG. 1 depicts an exemplary embodiment of a digital imaging system suitable for one or more aspects of the present invention.

The teachings herein are directed to a method and apparatus for resizing a halftone image using halftone tile parameters. In particular, the teachings herein resize an image by manipulating halftone tiles or cells along low energy halftone tile seams. By using the tile parameters to define the low energy halftone tile seams, a halftone image can be resized while avoiding the defects associated with applying known resizing methods directly to halftone images.

In one embodiment of the teachings herein, a halftone image is received and a region of the digital halftone image is resized through manipulation (be it replicating or deleting) of low energy halftone tile seams within the halftone image. Halftone cell parameters are received or derived from analysis of the halftone image. A resizing factor or factors are received and are used to determine if the manipulation is directed to replicate low energy halftone tile seams or delete low energy halftone tile seams, and to determine the orientation of the seam to be manipulated (vertical or horizontal). The resizing factor and the cell parameters are used to determine what number of low energy halftone tile seams need to be removed or duplicated.

The energy of halftone tile seams within the halftone region is determined using an energy metric, such as the magnitude of the gradient. That energy metric may be derived on a pixel basis and spatially quantized to conform to halftone tiles, or it may be derived directly from the tiles. The energy metric may also be a function of descreened values of pixels within the halftone image region. This energy metric as determined for locations within the halftone image region is used to form an energy map.

The energy of the halftone tile seams is determined by using the energy map, where halftone tile seams are a connected path of cells that run either vertically or horizontally through the image region depending on the required resizing. The energy of a halftone tile seam is a function of the integrated energy along the path of the halftone tile seam. A number of low energy halftone tile seams will be manipulated, where the number depends on the resizing factor and the halftone cell parameters. Resizing factors greater than 1 are defined to require low energy halftone tile seam replication while resizing factors less than 1 require low energy halftone tile seam deletion.

The low energy halftone tile seams are manipulated according to their energy ranking, where halftone tile seams possessing lowest or relatively low energy are selected first for manipulation. A seam is considered a low energy seam if its energy is below a threshold, which may be a function of the energy level of the minimum energy seam. Low energy halftone tile seams can be manipulated either as a group, or the manipulation can be performed iteratively, where within the iterations, halftone tile seam energy is recomputed when one or more low halftone tile seams are removed or replicated, and the recomputed halftone tile seam energy is used for ranking and subsequent manipulation.

For a general understanding of the present invention, reference is made to the drawings. In the drawings, like reference numerals have been used throughout to designate identical elements. In describing the present invention, the following term(s) have been used in the description.

The term "cell" indicates consistent unit area and shape of pixels or halftone threshold values arrayed in manner that fills a region without forming gaps.

The terms "tile" and "Holladay tile" are used synonymously within the present disclosure, and indicate cells that are rectilinear in shape, constructed of vertical sides and horizontal sides. Due to these characteristics they are convenient for use in horizontal or vertical resizing.

There are several equivalent representations for the periodic structure of a halftone image. For example, parameters that describe the tiling of cells or parameters that describe the tiling of Holladay tiles both fully describe the halftone structure for an image. Thus, "cell parameters" and "tile parameters" and related representations described more fully below possess equivalent information and transformations may be made between the representations.

"Descreening" refers to methods to remove the halftone dot structure of an image to produce a continuous tone version of the image.

"Eight-connectivity" commonly refers to pixels that touch neighboring pixels either on a side or a corner, where it is understood that any flat edge of a tile or pixel is considered a side regardless of orientation. That is, if two pixels are adjacent, side-by-side or corner-touching, they are said to be eight-connected. We extend the definition of eight-connectivity of pixels, to cells of pixels to refer to a neighboring relationship between two cells where at least one pixel in the first cell is eight-connected to at least one pixel in the second cell. An "eight-connected path" is an unbroken string of eight-connected pixels or eight-connected cells.

A "seam" is an optimal eight-connected path of pixels on a given image from top to bottom, or left to right, where optimality is defined by a low value of an image energy function. A "low energy seam" is a seam possessing an energy metric that is below a threshold level. The threshold level can be a function of the energy level of the minimum energy seam, such as 20% greater than the energy level of the minimum energy seam.

"Energy" refers to the variation in gray levels around a pixel or variation in halftone cell values around a halftone cell. Neighboring pixels or neighboring cells that have similar values possess low energy, while neighboring pixels or neighboring cells that possess very different values possess higher energy. An energy metric is a measure of energy, such as the sum of the magnitude of the gradient along an eight-connected path.

Within the field of halftoning, the term "screen" is sometimes used to denote an array of threshold values, and sometimes used to denote the periodic structure of a halftone image. Within the present disclosure we are not concerned with a halftoning process, so use of the term "screen" herein will denote the periodic halftone structure unless the context refers to a screening process.

In FIG. 1, as depicted therein is one embodiment of a digital imaging system suitable for one or more aspects of the present invention. In the system 110, image source 120 is used to generate image data that is supplied to an image processing system 130 (including a digital front end), and which produces output data for rendering by print engine 140. Image source 120 may include scanner 122, computer 124, network 126 or any similar or equivalent image input terminal. On the output end printer engine 140 is preferably a xerographic engine however print engine 140 may include such equivalent print technology alternatives as wax, ink jet, etc. The teachings presented herein are directed toward aspects of image processor 130 depicted in FIG. 1. In particular, the intention of the teachings presented herein is to identify, and render accordingly, seams within a digital image. It will be appreciated by those skilled in the art that the rendering of an image into a printable or displayable output format may be accomplished at any of a number of locations, which herein is provided for in but one example only as occurring within the image processing system 130 or within in the print engine 140.

Many applications can be envisioned within the system embodiment 110. For instance, consider that a document can be rasterized and halftoned by a computer 124 for a particular print path and printer 128. That document may be directed to a different printer 140, possibly years later when extracted from an archive 129, with different paper size capabilities and may require image editing, cropping and resizing of halftoned image content prior to printing on the given print engine. Halftoned images may acquired from a scanner 120 or retrieved from an archive 129 as part of a document to be re-purposed. The document may be directed to print on different paper sizes, and may be redesigned with different layout requirements, thereby requiring resizing of its various elements, such as the halftone image. Printed halftone images may be scanned using a scanner 122 in a setting such as at a digital copier, and a user may wish to modify the image attributes such as size, aspect ratio, or image content prior to printing on a printer 140.

Figure 2:
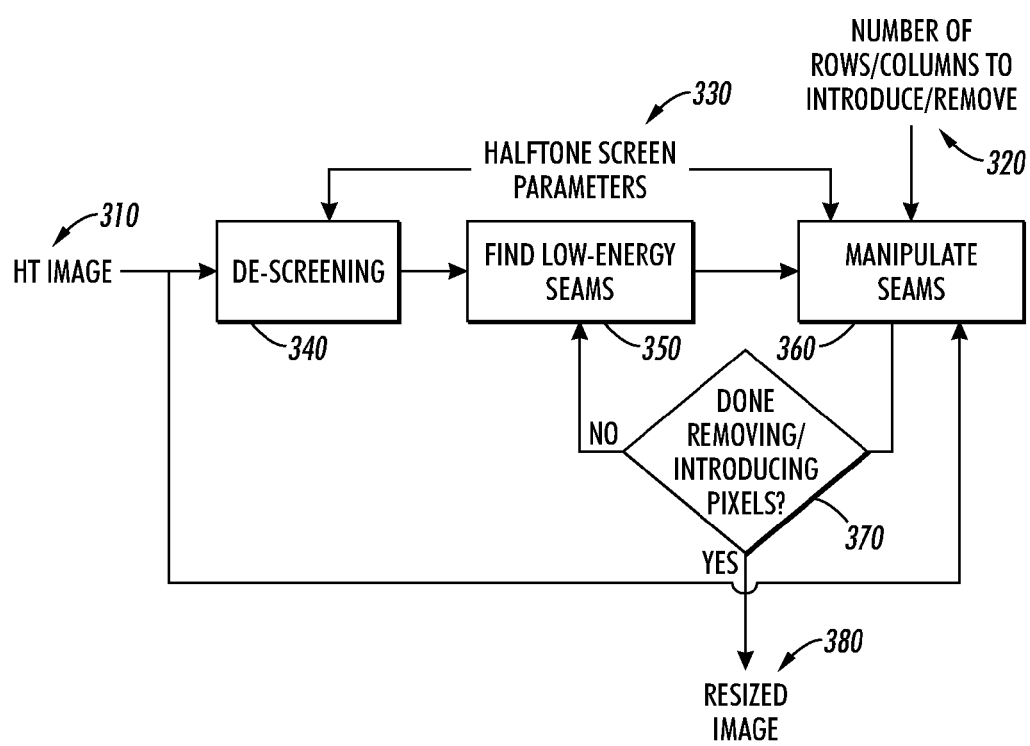
FIG. 2 Schematic depicting an embodiment of the method taught herein.

FIG. 2 provides a schematic for embodiments directed to the method taught herein. One embodiment of the method receives a halftone image region 310 and a resizing factor or factors. A factor indicates a desired magnification change for a particular orientation (e.g., vertical or horizontal). The magnification factor corresponds to a number of rows or columns of pixels to be deleted or replicated. An alternative to receiving a magnification factor is directly receiving the number of rows or columns of pixels to be manipulated within the region 320. Halftone tile parameters can optionally be input or they can be estimated from the halftone image 330. The method applies a descreening operation 340 to the input halftone image to produce a continuous-tone image. The descreening operation may use the halftone tile information so that the halftone texture may be well removed. Seams are found within the contone image 350. The halftone tile seams are determined from connected halftone tiles or determined from connected pixels and converted to connected halftone tiles. The low energy seams of connected tiles (low energy halftone tile seams) are either removed or replicated 360 as needed in the input halftone image until 370 the desired resizing is achieved and a resulting rescaled halftone image is output 380.

Halftone tile parameters may be known in some image processing settings. For instance, in a binary printer image path, the Digital Front End (DFE) 130 of the print engine 140 may possess one or more halftone threshold arrays that are used to performed the halftoning operation. Knowledge of the halftone threshold arrays can provide the halftone tile information. If the halftone tile information is not known a priori, it can be derived via a frequency analysis. For instance, digital image processing analysis can be used to estimate the halftone cell parameters of a scanned halftone image in a digital copier setting. Various techniques have been applied to this estimation problem, such as finding the maximum of an auto-correlation or Fourier transform, or performing wavelet analysis. Examples of methods for estimating halftone parameters are taught by Schweid in U.S. Pat. No. 6,734,991, Shiau and Lin in U.S. Pat. No. 7,239,430, and Lin and Calarco in U.S. Pat. No. 4,811,115. The disclosure found in these patents is hereby incorporated by reference in its entirety.

Key to the present invention is an understanding of halftoning tiling and halftone tile parameters. As will be shown, there are equivalent forms of halftone structure representation, such as frequency vectors, spatial vectors and Holladay tile parameters. Knowing one representation and its parameters allows determination of a form that is most convenient for the halftone tile seam manipulation. Due to the rectilinear characteristics of Holladay tile parameters, they are convenient for use in horizontal or vertical resizing. Due to the equivalence in representing halftone structure, within the present disclosure we often simply write "halftone tile parameters."

Rationally angled periodic halftone screens can be represented in several equivalent forms. For instance, the periodic structure is often described by either two spatial vectors or two frequency vectors specifying the frequency and orientation of halftone periodicity. For presenting the teachings herein, a useful representation for halftone periodicity is the replication of rectangular cells with vertical and horizontal sides. For rationally angled periodic screens, Holladay, in U.S. Pat. No. 4,185,304 has shown that there is such a rectangular halftone cell representation that is equivalent to the spatial vector and frequency vector representations. The disclosure found in U.S. Pat. No. 4,185,304 is hereby incorporated by reference in its entirety. The representation of the equivalent rectangular cell requires only three parameters in addition to the threshold values. We use the term "Holladay tile" to denote the tiles associated with halftone tiling utilizing rectangles having vertical and horizontal sides.

Figure 3:
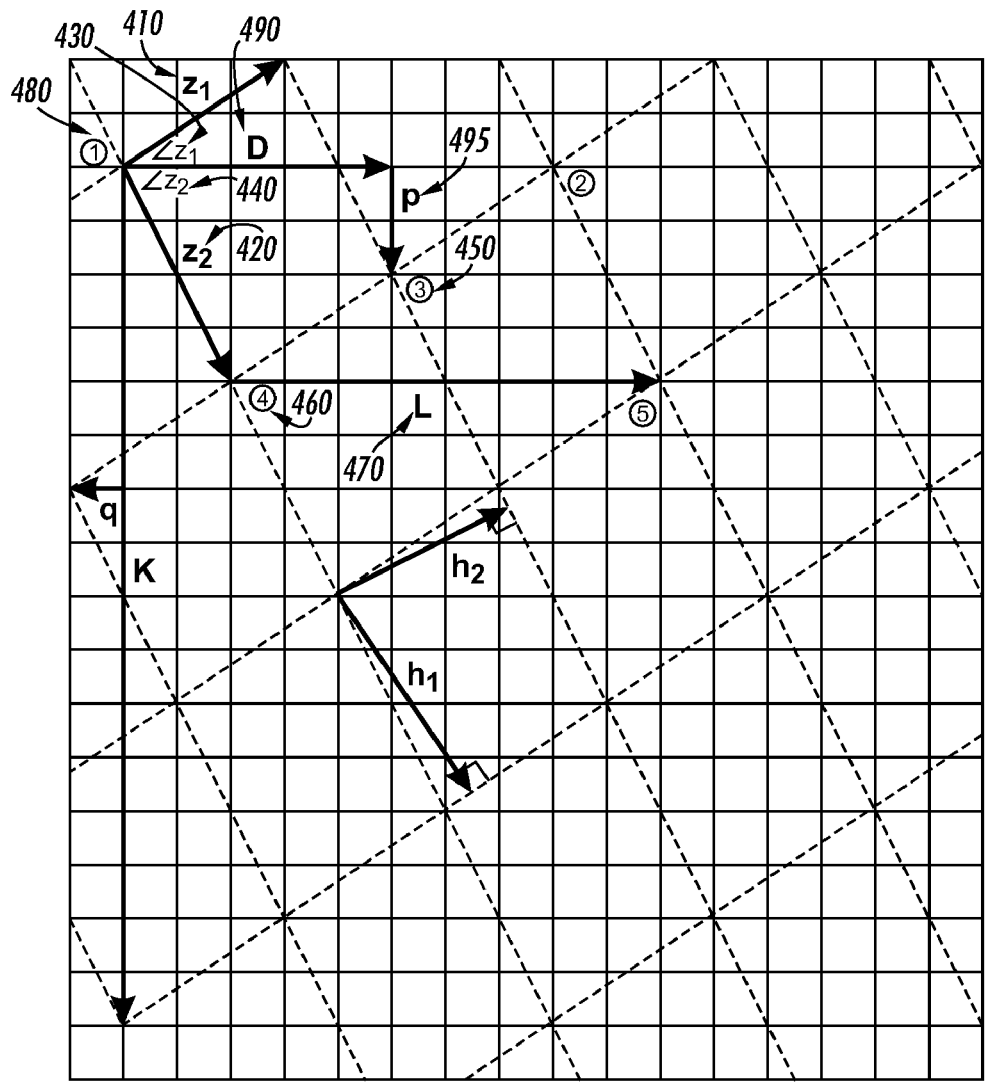
FIG. 3 Schematic depicting relationship between pixels, halftone spatial vector representation, and parameters that relate to Holladay representation.

FIG. 3 teaches the relationship between halftone vector representation, which is often used to represent halftone cells aligned on a rational angle, and rectangular tile representation. Let $z_1$ 410 be the spatial vector located in the first quadrant and let $z_2$ 420 be the frequency vector located in the fourth quadrant. The halftone screen represented by the spatial vectors $z_1$ and $z_2$ can be thought of as the replications of parallelogram halftone cells with sides of length $\|z_1\|$ and $\|z_2\|$ at angles $\angle z_1$ 430 and $\angle z_2$ 440, where $\|z\|$ is the norm of vector z and $\angle z$ is its angle. Let $z_i = (x_i, y_i)$ be the rectangular coordinate representation of the vector whose polar coordinate representation is $(\|z_i\|, \angle z_i)$, for i=1, 2. For a rationally angled halftone screen, $x_i$ and $y_i$ are integers. The area of each parallelogram is $$A = \|(x_1, y_1) \times (x_2, y_2)\| = x_2 y_1 - x_1 y_2, \quad (1)$$

where × is the vector cross-product operator.

Figure 4:
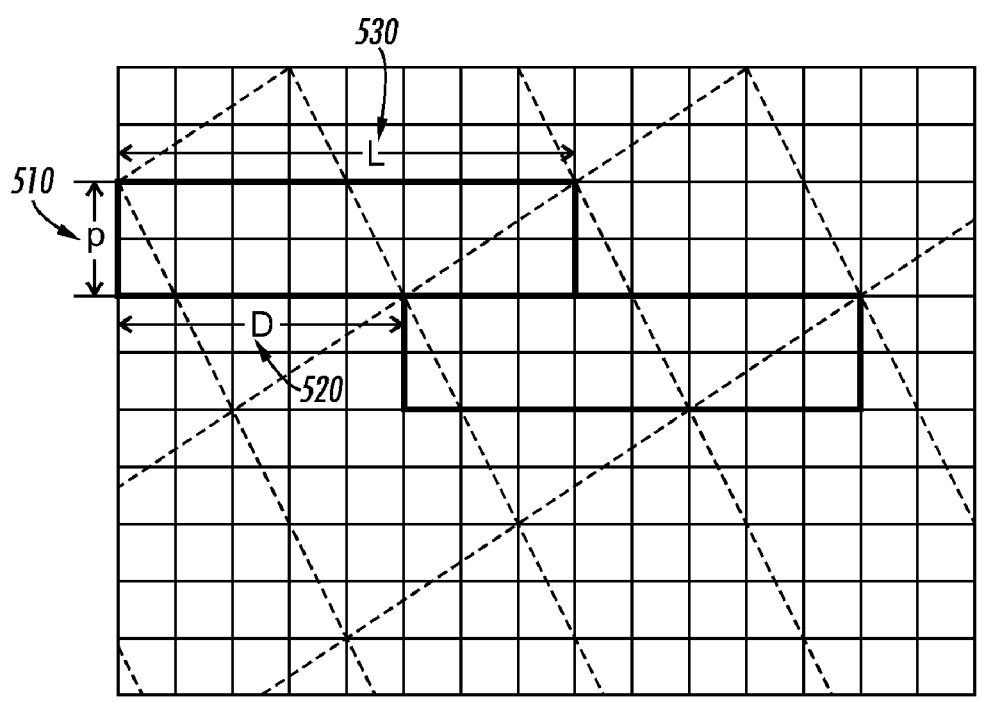
FIG. 4 Schematic depicting relationship between pixels, a rotated halftone screen, a Holladay tile, and the parameters in the Holladay representation.

Alternatively, frequency vectors $f_1$ and $f_2$ may be provided instead of spatial vectors when specifying the halftone screen. Vector $f_i$ is parallel to vector $h_i$, which is the height of the parallelogram perpendicular to vector $z_i$ for i=1, 2 as illustrated in FIG. 4. The magnitude of vector $f_i$ is equal to the reciprocal of the magnitude of vector $h_i$ for i=1, 2.

Let L be the shortest distance along the horizontal axis in which the parallelogram pattern recurs (points 3 450 and 4 460 in FIG. 4), and let L 470 be its corresponding vector. Since L 470 is obtained by following a path along the sides of the parallelogram, it must be the result of the addition of an integer number of vectors $z_1$ 410 and $z_2$ 420. Mathematically, $$L = k z_1 + j z_2, \quad (2)$$

where k and j are the smallest integer values that satisfy the equation. Decomposing Eq. (2) into its components, we get $$L = k x_1 + j x_2, \quad (3)$$

$$0 = k y_1 + j y_2. \quad (4)$$

Let p be the greatest common divisor of $y_1$ and $y_2$. Then $$p = -y_1/j = y_2/k \geq 1. \quad (5)$$

Combining Eq. (5) with Eq. (3) and substituting into Eq. (1) gives area $$A = Lp. \quad (6)$$

Since A and p are known (either $z_1$ 410 and $z_2$ 420 or $f_1$ and $f_2$ are known), L can be calculated.

A similar analysis in the vertical direction yields area $$A = Kq, \quad (7)$$

where K is the shortest vertical distance in which the parallelogram pattern recurs and q is the greatest common divisor of $x_1$ and $x_2$. Since A and q are known, K can be calculated.

Equations (6) and (7) imply that an integer number of trapezoids with area A fit inside a rectangle with dimensions K height and L width. This is an insight into the equivalence between halftone screen representation using rationally-angled trapezoids and representation using Holladay tiles.

Equation (6) implies that the area of one parallelogram is contained in a rectangular block of area A=Lp (see FIG. 4), which must repeat itself a distance of p 510 units in the vertical direction but displaced in the horizontal direction a certain amount D 520 to account for the slant of the original halftone screen so that it falls on the same position in the angled grid defined by the screen (see points 1 and 3 in FIG. 4). In order to get from point 1 480 to point 3 450, a path defined by the vectors D 490 and p 495 may be followed; alternatively, a path obtained by concatenating an integer number of vectors $z_1$ 410 and $Z_2$ 420 can also be traced. In mathematical terms, $$D + p = m z_1 + n z_2, \quad (8)$$

which has a unique solution for D 490, m and n if additional constraints such as m≧n and D≦L are imposed. Successive displacements by D 520 in the horizontal direction and p 510 in the vertical direction give the location for the next rectangular cell of horizontal width L 530 with area A. This means that, in effect, a rectangular tile and displacement can represent a rationally-angled screen. The parameters that are needed to uniquely specify a halftone screen using rectangular tiles are L 530, p 510 and D 520.

It should be noted that the above analysis defined a rectangular tiling with a row-to-row displacement in the horizontal direction. As will be appreciated by those skilled in the art it is straightforward to rotate the analysis by 90 degrees to define rectangular tiling with a column-to-column displacement in the vertical direction.

Further, we must note that tiles that directly correspond to halftone frequency vectors can be combined to form larger tiles that fill the image plane. For instance, a halftone defined by a frequency vector of 212 cells/inch at 450 constructed from pixels at 600 per inch corresponds to a Holladay halftone tile that is 2 pixels in height, 4 pixels in width, and offset in successive rows by 2 pixels. Those tiles can be groups in many ways to form larger tiles, sometimes referred to as supercells, or multi-centered cells, that cover the image. One example is that two tiles in a row can be combined to form a dual-dot tile that is 2 pixels by 8 pixels in dimension, and successive rows are offset by 2 pixel. An alternative dual-dot tile can be constructed of tiles on two rows to be 4 pixels by 4 pixels in dimension with an offset of 0 pixels. Those skilled in the art of halftone design can produce many alternative tilings by combining smaller tiles in variations. With respect to the teachings herein, resizing using the smallest possible tile is expected to yield the best image quality due to the fineness of the tile. On the other hand, a tile composed of multiple smaller tiles offers the advantage of reduced computation because a larger number of pixels are affected in each seam manipulation.

A descreening step is utilized in one embodiment of the teachings herein to prevent the confounding of the "energy metric" that is used to find low energy halftone tile seams in the image. Content-aware halftone image resizing finds low energy halftone tile seams that can be removed or replicated without drastically changing the appearance of the image, thus producing a graceful resizing of the original image. Descreening produces a continuous-tone (gray-scale) representation of the input halftone image region and can prevent the presence of halftone texture from interfering with the energy metric. Failure to prevent such texture interference could lead to potentially erroneous decisions as to which regions of the image have the least visible impact on the overall appearance. There are numerous descreening methods that can be utilized by one skilled in the art to obtain a continuous-tone representation of the input halftone image. Examples of methods for descreening are provided in Harrington in U.S. Pat. No. 6,864,994, Fan et al., in U.S. Pat. No. 6,839,152, and De Queiroz et al., in U.S. Pat. No. 5,799,112. The disclosure found in these patents is hereby incorporated by reference in its entirety for their teachings.

A seam is defined as a low energy eight-connected path that traverses the image from top to bottom or from left to right. Eight-connectivity commonly refers to pixels that touch neighboring pixels either on a side or a corner, where it is understood that any flat edge of a tile or pixel is considered a side regardless of orientation. That is, if two pixels are adjacent, either as side-by-side or corner-touching, they are said to be eight-connected. We herein extend the definition of eight-connectivity of pixels, to cells of pixels to refer to a neighboring relationship between two cells where at least one pixel in the first cell is eight-connected to at least one pixel in the second cell. An eight-connected path is defined as an unbroken string of eight-connected pixels or eight-connected cells. A given seam as defined for the purposes of the present disclosure can only have one type of strong connectivity, vertical or horizontal, where strong connectivity refers to side-to-side touching, as opposed to corner touching, which is referred to as weak connectivity. For instance, a seam that traverses an image region from top to bottom may not possess strong horizontal connectivity, and vice versa. Within the teachings provided herein, where the distinction between a seam of pixels and a seam of halftone tiles is important, we refer to a seam constructed of halftone tiles as a "halftone tile seam."

Figure 5:
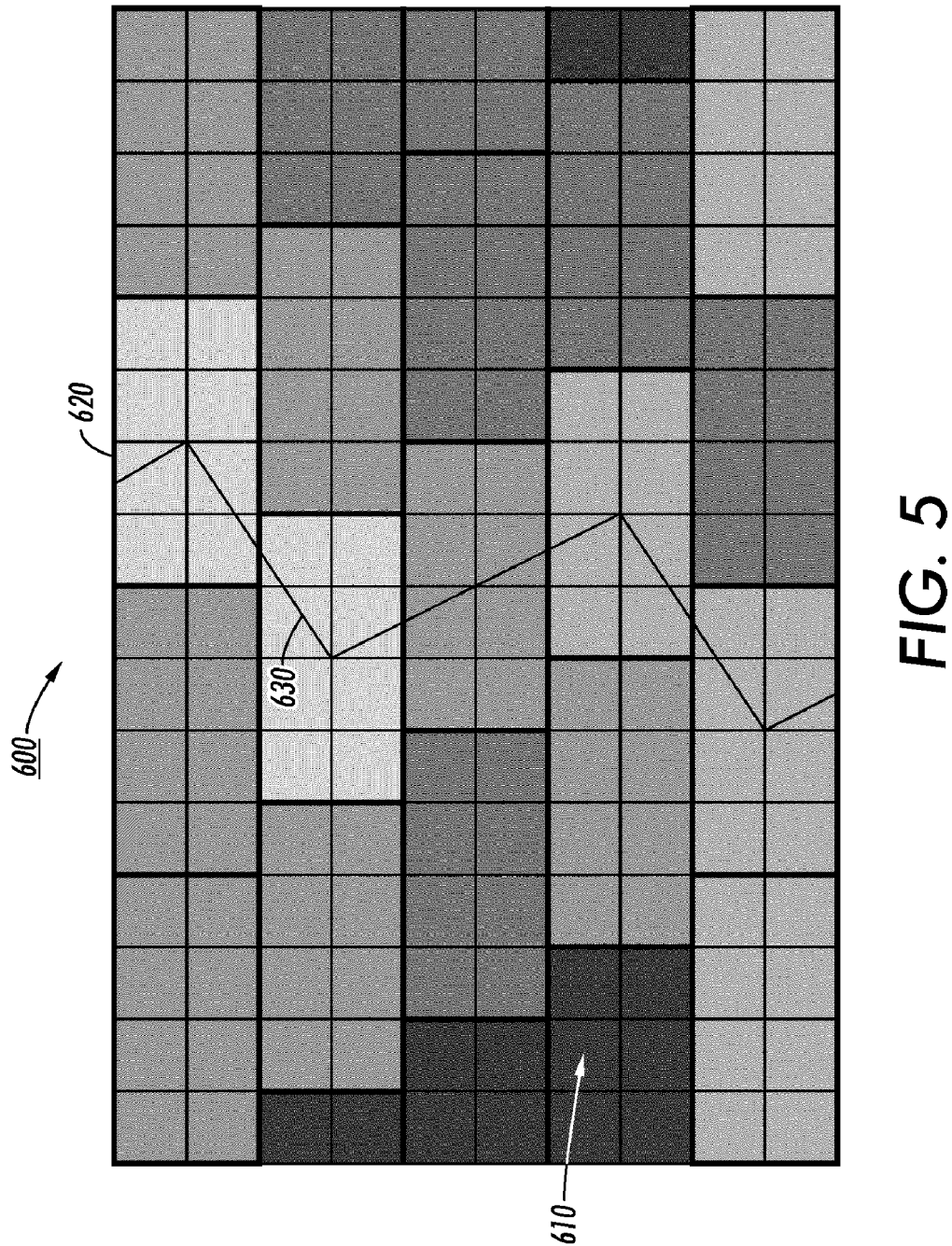
FIG. 5 depicts an example of Holladay halftone tiles and a vertical halftone tile seam connecting low energy tiles.

FIG. 5 illustrates a low energy halftone tile seam running vertically through a section of a digital image. The tiles are formed of 2×4 pixel blocks, where each successive row of blocks is offset by 1 pixel. In the figure, the darkness of a tile represents the energy of that tile. For example, tile 610 is relatively dark and is illustrative of a high energy tile, while tile 620 is relatively light and illustrative of a low energy tile. A vertical low energy halftone tile seam 630 is formed by connecting the centers of low energy halftone tiles along a path from the top of the image section to the bottom of the section. Removing or replicating tiles along this path 630 would have the least noticeable impact on the visual appearance of the image, and thus is desirable for manipulation for resizing.

The optimality of a seam depends on the desired application. In resizing images according to the teachings herein, a desired image size is achieved by repeatedly removing or replicating low energy halftone tile seams that run in the appropriate direction. In this application, the optimality of a halftone tile seam refers to the degree to which it would not be noticed upon removal or replication. In this case, a halftone tile seam is optimal if the pixels or cells that make up the halftone tile seam are located in regions with little activity as measured by an energy metric. By activity, we mean variations in gray level within a spatial region. A region with high gray level variation is said to have high activity and would possess a high value energy metric. In one embodiment of the teachings herein, the energy metric at each pixel or cell is the magnitude of the local image gradient: the larger the local gradient, the larger the energy at that particular pixel or cell. A discussion of the gradient is provided to aid in teaching the presently disclosed method, and is not intended to limit the energy determination step to gradient-based metrics.

A monochromatic image can be seen as a function of two variables, f(x,y) whose value at $(x,y)=(x_0,y_0)$ is the gray value of the pixel located in row $x_0$ and column $y_0$ of the image. In one embodiment of the present teachings herein, the energy metric at each pixel is determined as the magnitude of the local image gradient: the larger the local gradient, the larger the energy at that particular pixel. The gradient of a two-variable function is defined as the two-dimensional vector $$\nabla f(x, y) = \left[\frac{\partial f}{\partial x}, \frac{\partial f}{\partial y}\right]. \quad (9)$$

with magnitude $$|\nabla f(x, y)| = \sqrt{\left(\frac{\partial f}{\partial x}\right)^2 + \left(\frac{\partial f}{\partial y}\right)^2}, \quad (10)$$

where ∂f/∂x and ∂f/∂y are directional derivatives in the x and y direction, respectively. Directional derivatives can be approximated by applying spatial kernels that compute finite differences. Examples of such spatial kernels are the Prewitt, which are described in "Fundamentals of Digital Image Processing" by A. Jain, Prentice Hall. 1989:

$$\begin{bmatrix} -1 & 0 & 1 \\ -1 & 0 & 1 \\ -1 & 0 & 1 \end{bmatrix}, \begin{bmatrix} -1 & -1 & -1 \\ 0 & 0 & 0 \\ 1 & 1 & 1 \end{bmatrix}, \quad (11)$$

and the Sobel, which are described in "Digital Image Processing," by R. Gonzalez and P. Wintz, Addison-Wesley Publishing Company, $2^{nd}$ Edition, 1987:

$$\begin{bmatrix} -1 & 0 & 1 \\ -2 & 0 & 2 \\ -1 & 0 & 1 \end{bmatrix}, \begin{bmatrix} -1 & -2 & -1 \\ 0 & 0 & 0 \\ 1 & 2 & 1 \end{bmatrix}. \quad (12)$$

The Laplacian, also described in the books by Jain, and Gonzalez and Wintz, is another measure of local energy that is less computationally expensive since it only requires the application of one kernel. Mathematically, it is defined as $$\nabla^2 f(x, y) = \frac{\partial^2 f}{\partial x^2} + \frac{\partial^2 f}{\partial y^2}, \quad (13)$$

and can be approximated with the kernel $$\begin{bmatrix} 0 & 1 & 0 \\ 1 & -4 & 1 \\ 0 & 1 & 0 \end{bmatrix}. \quad (14)$$

However, due to the second-order derivative, the Laplacian operator is more sensitive to noise than the gradient operators.

Note that other contone energy metrics may be used within the present teachings, for example functions of the gradient, entropy, visual saliency, eye-gaze movement, Harris corners, output of face detectors, and other specific feature detectors as discussed by Avidan and Shamir in "Seam Carving for Content-Aware Image Resizing" ACM Transactions on Graphics, Volume 26, Number 3, SIGGRAPH 2007.

In one embodiment of the teachings herein the method calculates the energy metric at each pixel or cell of the continuous-tone image and then searches for the seams with lowest energy content that traverse the image from top to bottom for horizontal resizing and from left to right for vertical resizing. Several alternative embodiments of the low energy seam calculation are within the scope of the teachings herein. In one embodiment, a low energy seam is determined directly from individual pixel values and spatially quantized to a halftone tile seam that contains the pixel-based seam. In another embodiment, the energy of the pixels within each cell is combined and the halftone tile seams are determined from the combined energy as found within the cell. In yet another embodiment, the energy metric is computed from cell values, where integrated pixels values within each cell, produce the cell value. The energy metric in this embodiment is based on the difference between the value of a cell and the values of its neighboring cells. This metric can computed in a manner similar to using kernels as found in Eqs. (11), (12) and (14), but the weights in the kernel would be positioned to be compatible with the given cell tiling rather than the conventional Cartesian pixel tiling. Alternatively, direct application of differencing equations, such as the Laplacian [Eq. (14)] can be applied using cell values and positions rather than the conventional pixel-based method.

The energy metrics used for determining low energy seams discussed thus far have been derived from a contone image representation of the received halftone image. It is within the scope of the teachings herein to alternatively derive energy metrics and low energy halftone tile seams directly from the halftone image. For instance, a measure of cell-to-cell difference is an energy metric. A useful cell-to-cell difference metric is a count of the number of pixels within a cell that are of a different state than corresponding pixels within its neighboring cells. Stated mathematically, $$E = \sum_k \sum_{i,j} (C(i, j)) XOR(N_k(i, j)),$$

where E is the energy of the cell C, C(i, j) are the halftone pixel values of the cell at positions i, j, and $N_k(i, j)$ are the halftone pixel values of the cell at corresponding positions i, j within the kth neighboring cell, and XOR is the Exclusive OR operation.

One method to determine an optimal seam from energy metrics, is to employ an exhaustive search that calculates the energy of every possible seam that originates at each pixel or cell of the first row (column) of the image. A more computationally efficient alternative approach is to use a dynamic programming method, because it can eliminate redundancy within the exhaustive approach. This redundancy is present because seams originating at neighboring pixels (or cells) may have multiple pixels (or cells) in common.

At each iteration, the dynamic programming approach traverses the energy map row by row to define vertical seams or column by column to define horizontal seams and finds the cumulative minimum energy at each pixel or cell of each row (or column). At the end of the process for determining vertical seams, the smallest value on the last row indicates the end point of the optimal path that traverses the image from top to bottom. At the end of the process for determining horizontal seams, the smallest value on the last column indicates the end point of the optimal path that traverses the image from left to right. The remaining pixels (or cells) that belong to the seam are found by traversing the energy map in the opposite direction and picking the neighboring pixel (or cell) with the smallest cumulative energy in each subsequent adjacent row for vertical seams or column for horizontal seams.

Once a low energy halftone tile seam is found, it will need to be replicated or removed as depending on the resizing factor. To achieve acceptable visual appearance a halftone tile seam does not need to possess the absolute lowest energy to be selected for replication or deletion. It is sufficient for the halftone tile seam to possess relatively low energy as can be determined via an energy threshold. For example, halftone tile seams possessing energy below a threshold of 5% above the minimum seam energy as determined from the image can be selected for manipulation.

As previously noted, replicating or removing a single arbitrary pixel in a row or in a column of a halftone image will introduce resizing streaks. In order to avoid the introduction of artifacts, the presently taught method manipulates low energy seams constructed of cells, rather than pixels. Resizing factors greater than 1 require low energy halftone tile seam replication while resizing factors less than 1 require low energy halftone tile seam deletion. A resizing factor that does not equal 1 in the vertical direction requires manipulation of horizontal low energy halftone tile seams, while a resizing factor that does not equal 1 in the horizontal direction requires manipulation of vertical low energy halftone tile seams. Resizing factors not equal to 1 may be provided for each orientation, and low energy halftone tile seam manipulation could proceed in serial, one orientation after the other, or low energy halftone tile seam manipulation could alternate between directions until the adequate number of low energy halftone tile seams is manipulated for each orientation.

Let the height of the halftone cell be p pixels and its width L pixels. Then at each iteration of low energy halftone tile seam manipulation for a resizing factor less than 1, the removal of a low energy halftone tile seam results in the removal of p pixels for vertical manipulation and L for horizontal manipulation. Similarly, at each iteration of low energy halftone tile seam manipulation for a resizing factor greater than 1, the replication of a low energy halftone tile seam results in the replication of p pixels for vertical manipulation and L for horizontal manipulation. Thus, the image is decreased or increased in height or width by multiple pixels in each iteration. This implies that if it is desired to decrease or increase the height or width of the image by m pixels, the process needs to be iterated [m/p] times for vertical manipulation and [m/L] times for horizontal manipulation, where [•] denotes the rounding operator, which approximates to the nearest integer. Alternatively, other rounding approaches, such as the nearest lower integer or nearest higher integer may be also be used. Thus, low energy halftone tile seam removal can achieve the desired resizing to the accuracy of the dimensions of a tile since a tile is the unit of manipulation.

As we have noted, typically, multiple low energy halftone tile seams must be manipulated to achieve the desired resizing. There are several alternatives within the scope of the present teaching for removing multiple low energy halftone tile seams. The alternatives exist because removing one or more seams can affect the energy metrics of other seams. The alternatives are important because some offer the advantage of a lower burden of computation, while other alternatives may provide better image quality, and yet other alternatives are a compromise between computational burden and optimal image quality.

A method for selecting multiple low energy seams that has a low computational burden employs a one-time calculation of seam energy. That is, the energy for many halftone tile seams may be calculated one time, and the appropriate number of low energy halftone tile seams can be selected from halftone tile seams possessing lowest values using the energy of the seams determined from the one-time calculation. When removing multiple seams based on a one-time energy calculation, it must be noted that a halftone tile can be a member of one or more seams. When this situation occurs, the seam is manipulated that possesses the lowest energy. The other seams that contain this tile are then not manipulated.

In terms of perceived image quality, a very high quality resizing produces an output that introduces the least abrupt density variation due to seam removal. A method for selecting multiple low energy seams that has the potential for achieving the highest image quality recalculates seam energy after each manipulation of a low energy halftone tile seam. This method ensures that the absolute lowest energy seam may be removed. Additionally, the issue of a tile belonging to two or more seams having low energy does not occur.

Alternative methods for removing multiple seams are a compromise between computational burden and optimal image quality. One of these compromise methods recalculates seam energy after a fixed number of low energy halftone tile seams have been manipulated. Another compromise approach to recalculating seam energy is to recalculate the energy when the next lowest energy halftone tile seam that has not been removed is sufficiently different in energy from low energy halftone tile seams previously removed. There are several ways that the difference can be determined. One method calculates the difference in energy with respect to the lowest energy seam found in the most recent seam energy calculation. Another method determines difference with respect to the highest energy seam removed thus far. Other differences may also be useful to consider, such as difference with respect to the mean energy of seam removed thus far. Differences on the order of, say 5% or great may merit an energy recalculation.

There are also several alternatives within the scope of the present teaching for replicating multiple low energy halftone tile seams. For example, one low energy halftone tile seam possessing the lowest or relatively low energy (for example, within 5% of the minimum energy seam) could be replicated until the resizing is achieved. For some image types it could be desirable to choose low energy halftone tile seams for replication that are spatially separated so that a noticeable band of low energy is not inserted into the image. In this situation, some number of spatially separated low energy halftone tile seams could be replicated to achieve the desired resizing. For example, it can be desirable to replicate low energy halftone tile seams that are separated by 3 or more halftone tiles.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for resizing a digital halftone image, the method comprising:
   receiving into a digital imaging system a digital halftone image and a desired resizing factor for a digital halftone image;
   defining cells within said digital halftone image;
   determining halftone screen parameters of said digital halftone image to define Holladay halftone tiles within said digital halftone image;
   determining, from said defined cells, a number of Holladay tile seams to delete, where an orientation of said number of seams is dictated by said received desired resizing factor;
   determining a seam energy of each of said determined number of seams, said seam energy being determined according to an energy metric so as to provide an indication as to which of said determined number of seams are low energy seams;
   iteratively deleting low energy seams to obtain a resized halftone image according to said resizing factor; and
   printing said resized halftone image on a printer.

2. The method of claim 1 where said methodology is only applied to a sub-region of said digital halftone image.

3. The method of claim 1 where at least one of said low energy seams possesses an energy which is below an energy threshold.

4. The method of claim 3 where said energy threshold is 5% greater than a lowest energy determined for any of said seams.

5. The method of claim 3 wherein said iterative deletion of low energy seams comprises recalculating seam energies after each deletion of a low energy seam.

6. The method of claim 3, wherein deletion of low energy seams comprises a one-time calculation of seam energy, wherein an appropriate number of low energy seams are selected for deletion from seams possessing lowest energy values using the seam energy determined from said one-time calculation, said iterative deletion repeating until said desired resizing factor is approximately met.

7. The method of claim 3 wherein said iterative deletion of low energy seams comprises recalculating seam energy after a fixed number of low energy seams have been deleted.

8. The method of claim 3 wherein said iterative deletion of low energy seams comprises recalculating seam energy when a next lowest energy seam that has not been removed is sufficiently different in energy from low energy seams previously removed.

9. The method of claim 8 wherein said difference in energy from said low energy seams previously removed is determined with respect to a lowest energy seam found in a most recent seam energy calculation.

10. The method of claim 8 wherein said difference in energy from said low energy seams previously removed is determined with respect to a highest energy seam removed thus far.

11. The method of claim 3 wherein said halftone screen parameters comprises: a width, height and offset for said cells.

12. The method of claim 11 wherein determining energy of said seams comprises summing the energy of descreened pixels within each respective Holladay tile.

13. The method of claim 12 wherein said energy is measured according to a metric defined by one of a function of, a gradient, entropy, visual saliency, eye-gaze movement, Harris corners, and an-output of face detectors.

14. The method of claim 3 wherein determining said energy of a seam according to said energy metric comprises integrating the energy of eight-connected cells along said seam that traverses said image in a direction dictated by said desired resizing factor.

15. The method of claim 3, wherein each Holladay tile used to form said seams represents a multi-center halftone cell.

16. The method of claim 3, wherein determining said energy seam according to said energy metric comprises summing a number of pixels within a given Holladay halftone tile that are of a different state than corresponding pixels within its neighboring tiles.

17. The method of claim 3, wherein determining said energy of seams according to said energy metric comprises an exhaustive search and a dynamic programming method.

18. A method for resizing a digital halftone image, the method comprising:
receiving into a digital imaging system a digital halftone image and a desired resizing factor for a digital halftone image;
determining halftone screen parameters for said digital halftone image;
defining cells within said digital halftone image from said determined halftone screen parameters;
determining from said cells and halftone cell parameters, a number of halftone tile seams to manipulate, where an orientation of said seams is dictated by said received desired resizing factor;
determining an energy for each of said seams according to an energy metric so as to provide indication as to which of said low energy seams is sufficient to achieve said desired resizing factor for said digital halftone image;
iteratively deleting low energy seams to obtain a resized halftone image; and,
printing said resized halftone image on a printer.

19. The method of claim 18 further comprising:
descreening said digital halftone image to provide descreened pixel values; and
determining said energy metric from said descreened pixel values so as to form an energy map.

20. The method of claim 18 where said methodology is only applied to a sub-region of said digital halftone image.

21. The method of claim 18 where at least one of said low energy seams possesses an energy which is below an energy threshold.

22. The method of claim 21 where said energy threshold is 5% greater than a lowest energy determined for any of said seams.

23. The method of claim 21 wherein said iterative deletion of seams comprises recalculating seam energies after each deletion of a low energy seam.

24. The method of claim 21, wherein deletion of low energy seams comprises a one-time calculation of seam energy, wherein an appropriate number of low energy seams are selected for deletion from seams possessing lowest energy values using the seam energy determined from said one-time calculation, said iterative deletion repeating until said desired resizing factor is approximately met.

25. The method of claim 21 wherein said iterative deletion of low energy seams comprises recalculating seam energy after a fixed number of low energy seams have been manipulated.

26. The method of claim 21 wherein said iterative deletion of low energy seams comprises recalculating seam energy when a next lowest energy seam that has not been removed is sufficiently different in energy from low energy seams previously removed.

27. The method of claim 26 wherein said difference in energy from said low energy seams previously removed is determined with respect to a lowest energy seam found in a most recent seam energy calculation.

28. The method of claim 26 wherein said difference in energy from said low energy seams previously removed is determined with respect to a highest energy seam removed thus far.

29. A method for resizing a digital halftone image, the method comprising:
receiving into a digital imaging system, a digital halftone image and a desired resizing factor for a digital halftone image;
defining cells within said digital halftone image;
determining from said defined cells, a number of halftone tile seams to manipulate, where an orientation of said number of seams is dictated by said received desired resizing factor;
descreening said digital halftone image to provide descreened pixel values;
determining an energy metric from said descreened pixel values so as to form an energy map;
determining an energy of each of said seams, said seam energy being determined according to said energy map so as to indicate a number of low energy seams at least sufficient to achieve said desired resizing factor;

iteratively deleting low energy seams to obtain a resized halftone image according to said resizing factor; and printing said resized halftone image on a printer.

30. The method of claim 29 where said methodology is only applied to a sub-region of said digital halftone image.

31. The method of claim 29 where said low energy seams are seams that possess an energy which is below an energy threshold.

32. The method of claim 31 where said energy threshold is 5% greater than a lowest energy determined for any of said seams.

33. The method of claim 31 wherein said iterative deletion of seams comprises recalculating seam energy after each deletion of a low energy seam.

34. The method of claim 31, wherein deletion of low energy seams comprises a one-time calculation of seam energy, wherein a predefined number of low energy seams are selected for deletion from seams possessing lowest values using the seam energy determined from said one-time calculation, said iterative deletion repeating until said desired resizing factor is approximately met.

35. The method of claim 31 wherein said iterative deletion of low energy seams comprises recalculating seam energy after a fixed number of low energy seams have been manipulated.

36. The method of claim 31 wherein said iterative deletion of low energy seams comprises recalculating seam energy when a next lowest energy seam that has not been removed is sufficiently different in energy from low energy seams previously removed.

37. The method of claim 36 wherein said difference in energy from said low energy seams previously removed is determined with respect to a lowest energy seam found in a most recent seam energy calculation.

38. The method of claim 36 wherein said difference in energy from said low energy seams previously removed is determined with respect to a highest energy seam removed thus far.

* * * * *